April 11, 1967    V. L. CARISSIMI    3,314,043
WIRING DEVICE HAVING BACK AND SIDE WIRING TERMINAL MEANS
Filed Jan. 28, 1964    2 Sheets-Sheet 1

WITNESSES
Theodore F. Wrobel
Edward F. Possessky

INVENTOR
Vincent L. Carissimi
BY
ATTORNEY

United States Patent Office 3,314,043
Patented Apr. 11, 1967

3,314,043
WIRING DEVICE HAVING BACK AND SIDE
WIRING TERMINAL MEANS
Vincent L. Carissimi, Fairfield, Conn., assignor to Westinghouse Electric Corporation, Pittsburgh, Pa., a corporation of Pennsylvania
Filed Jan. 28, 1964, Ser. No. 340,674
2 Claims. (Cl. 339—164)

The present invention relates to wiring devices and more particularly to wire attachment structure therefor.

In wiring devices where screw means are employed for wire attachment, "back wiring" and "side wiring" are both widely accepted wiring methods for use in wiring device installation. By "back wiring" it is meant that a wire is inserted into a device from its rearward side and wire attachment is then usually accomplished by a clamping nut which advances along a screw upon screw tightening. By "side wiring" it is meant that a wire is looped beneath the head of a side-facing screw and is secured in place upon screw tightening. The direction of wire approach can vary in the "side wiring" case, but usually it is also from the rearward side of the device.

Some electricians prefer "side wiring" devices while others prefer "back wiring" devices, and these preferences usually are based on such factors as the individual electrician's learned working habits as well as his perception as to which of the two methods provide the greatest ease of device installation. In addition, in some Governmental subdivisions, the local code does not permit "breaking" of a neutral wire. Thus, "looping" is necessary and this can only be accomplished by "side wiring." If a "side wired" device is removed, neutral or ground continuity is then assured to those "side wired" devices further on the branch circuit.

In any event, these separate product demands usually require the flow of separate wiring device products in the marketing channel. A provision for both wiring methods in a single device to the satisfaction of users thus can lead to marketing advantages of lower inventory and manufacturing costs.

"Universalization" of wiring devices in this respect is not an easy task primarily because of limitations imposed by standardized device geometry. Some effort has been made in this direction, but resulting wiring device structures have been characterized with wiring difficulties.

For example, in one approach a side-facing screw is freely extended through a terminal plate and a clamping nut is engaged with the screw on the terminal plate side opposite that on which the screw head is located. Wire can then be inserted between the nut and the terminal to provide "back wiring" or it can be looped under the screw head to provide "side wiring," but difficulties are encountered with both wiring methods. Since the overall length of the screw is fixed by the device geometry and since the thickness of the nut "uses" a corresponding amount of the screw threading, the maximum available wire (when the nut is located at the free end of the screw) between the terminal plate and the screw head is relatively limited. In addition, the screw is free for axial movement and the screw head can thus tend to rest on the terminal plate. Both of these factors can interfere with efficient "side wiring." Further, in "back wiring," the screw head must disadvantageously be held by the wireman against the terminal plate during wire insertion in order to provide the necessary opening (with the nut again located at the end of the screw).

An improved structure, providing both "back" and "side" wiring, can be embodied in accordance with the principles of the invention. Thus, on the basis of these principles, a wiring device comprises an insulative housing in which there are disposed a pair of electrically isolated terminal plate means. Each of the terminal plate means is provided with a captive screw and nut combination and a separate staked screw and otherwise is organized and arranged cooperatively with the housing so as efficiently to provide back and side wiring respectively to the captive and staked screws.

It is therefore an object of the invention to provide a novel wiring device wherein provision is efficiently made for both back and side wiring.

Another object of the invention is to provide a novel wiring device wherein back wiring is efficiently provided by a captive screw which need not be held during wire insertion and wherein side wiring is efficiently provided by a staked screw which produces ample wire insertion space and which is substantially fixed against axial tipping movement when fully withdrawn for wire loop attachment.

These and other objects of the invention will become more apparent upon consideration of the following detailed description along with the attached drawings, in which.

Figure 1:
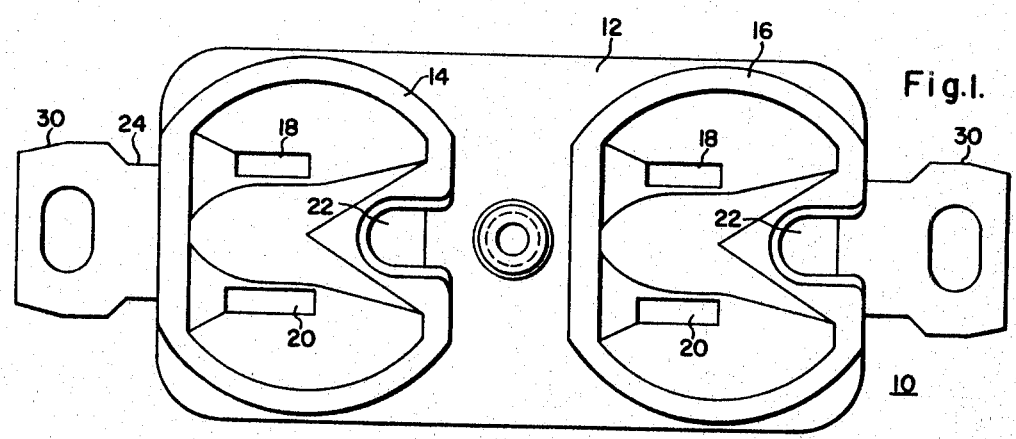
FIGURE 1 is a front plan view of a wiring device constructed in accordance with the principles of the invention and provided in the form of a grounding receptacle.

More specifically, there is shown in FIG. 1 a wiring device in the form of a grounding receptacle 10 constructed in accordance with the principles of the invention. It is noted, however, that these principles can be applied in other wiring device forms such as switches, switch-receptacle combinations, etc.

Figure 3:
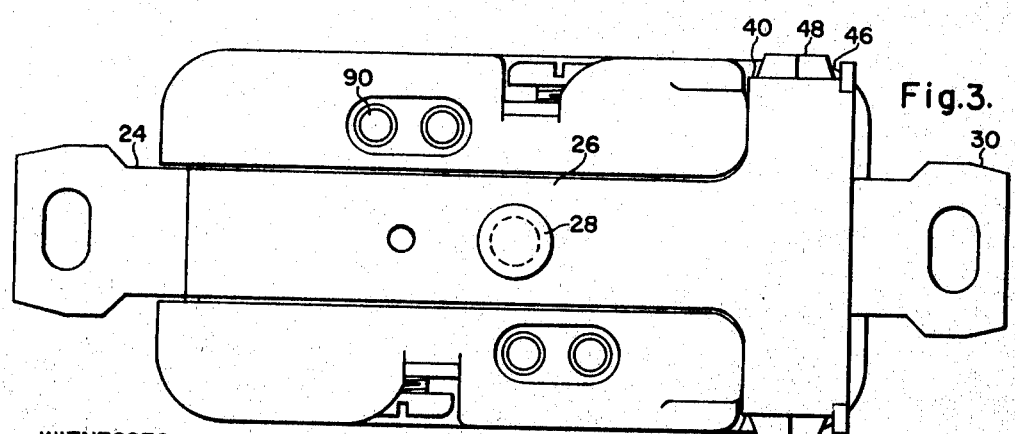
FIG. 3 is a rear plan view of the grounding receptacle shown in FIG. 1, and side wiring screws of the receptacle are shown herein as being withdrawn for wire loop attachment.

The grounding receptacle 10 includes an electrically insulative elongated housing 12 on the front side of which there are provided a pair of faced portions 14 and 16 having slots 18 and 20 extended therethrough for plug blade entry into the receptacle 10. In addition, each faced portion 14 or 16 is provided with a grounding prong slot 22 in the standard duplex receptacle location. A mounting member or yoke 24 is also provided and, as shown in FIG. 3, it is arranged in wrap-around form with strap portion 26 disposed on and extending along the rearward side of the housing 12. Suitable fastening means can be employed to secure the yoke 24 to the housing 12, for example, a screw 28 as shown in FIG. 3. A yoke for the grounding receptacle 10 can, of course, be provided in other forms and can be secured to the grounding receptacle housing by other suitable means.

The yoke 24 is in addition provided with a pair of mounting ears 30 and grounding contacts 32 and 34 are secured thereto, as by rivets, in alignment with the grounding prong slots 22 in the housing faced portions 14 and 16. Thus, the grounding contact 32 is disposed in a housing pocket 36 in its secured position, and the grounding contact 34 is disposed at one end of the housing 12 in a pocket 38 formed by side arms 40 and end portion 42 of the yoke 24 in cooperation with end portion 46 of the housing 12. To establish a ground circuit, terminal screws 48 are provided on the mounting member side arms 40.

Figure 4:
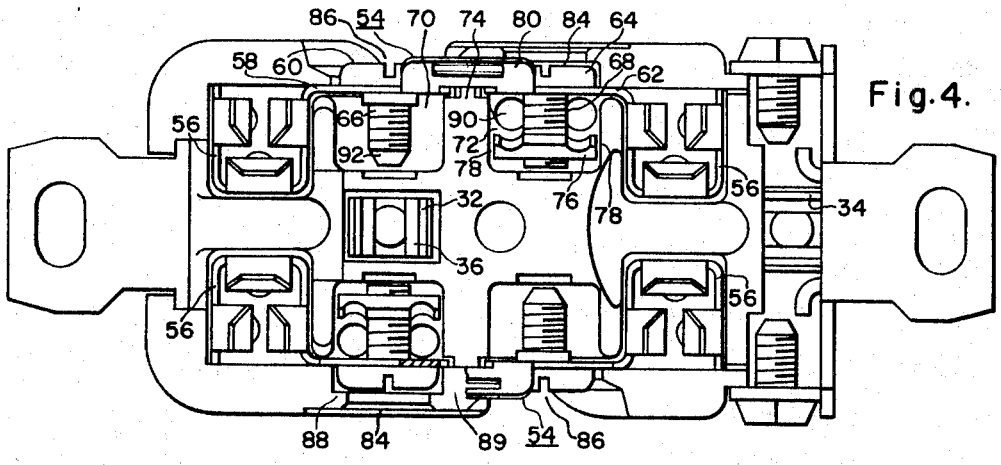
FIG. 4 shows a frontal view of a base member of the device of FIG. 1 as well as terminal and yoke members assembled therewith.
Figure 5:
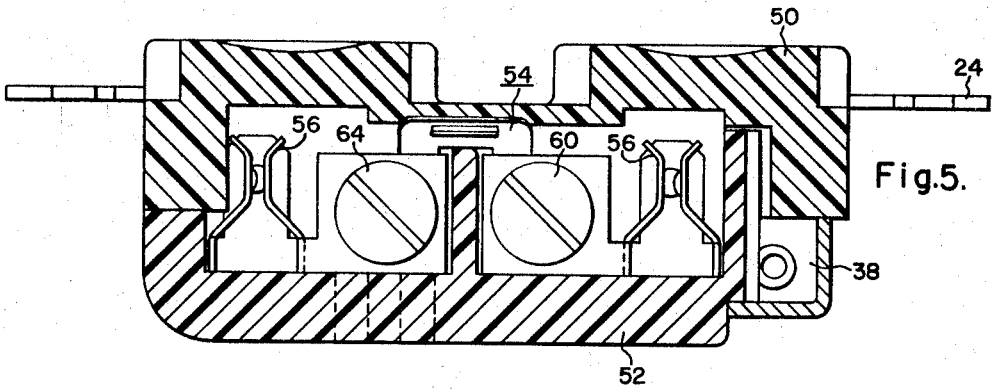
FIG. 5 shows a longitudinal section of the grounding receptacle taken along the reference line V—V of FIG. 4.
Figure 6:
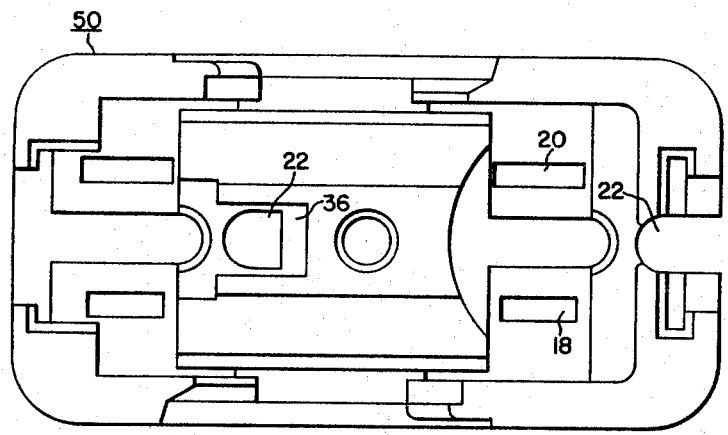
FIG. 6 shows a rear or inside plan view of a cover member employed in the receptacle of FIG. 1.

The receptacle housing 12 is in this case provided with two parts, a cover 50 and a base 52 which cooperate to provide interior housing space for substantially fixed disposition of a pair of electrically isolated terminal and contact means 54 (FIG. 4). Each terminal and contact means 54 is provided with a pair of contacts 56, of any well known construction, for engagement of plug blades inserted through the faced portion slots 18 and 20. Intermediately of the contacts 56, there are provided terminal plates 58 and 62 through which there are respectively inserted a side wiring screw 60 and a back wiring screw 64. Threaded side wiring screw shank 66 and threaded back wiring screw shank 68 extend into respective side and back wiring housing pockets 70 and 72 which are divided from each other by partition wall means 74. Each pocket 70 or 72 is provided with sufficient depth from the associated wiring device side for full inward advancement of the screw 60 or the screw 64.

The pocket 72 is provided with sufficient dimension along the length of the grounding receptacle 10 and along the rear to front direction of the receptacle 10 so as to provide for the dispostion of nut 76 therein. However, one or more of the dimensions of the pocket 72 just indicated is such that the nut 76 is captivated therein against rotation (as indicated by the reference character 78 in FIG. 4) when the back wiring screw 64 is twisted in engagement therewith. As will subsequently become more apparent, the nut 76 thus advances toward or withdraws from the terminal plate 62 depending on the direction of twisting movement of the back wiring screw 64. The side wiring screw pocket 70 is similar or identical with the pocket 72, but there is no need for captivating a nut in the pocket 70 because of the manner in which wiring is accomplished with the side wiring screw 60.

Preferably, the terminal plates 58 and 62 are separated from each other by the partition wall means 74 but are interconnected by an integral conductive bridge member 80 which slants outwardly and frontwardly from the terminal plates 58 and 62. Correspondingly sloped surface 82 on the cover 50 thus can be employed to retain the terminal contact means 54 in the base 52 against forward movement when the base, cover and yoke member are secured together by the aforementioned fastening means 28.

Side openings or side-opening portions 84 and 86 co-operatively provided by the base and cover 50 and 52 provide access for operation of the back wiring and side wiring screws 64 and 60 respectively. Retaining shoulder means 88 adjacent the housing opening 84 and retaining portion 89 of the partition wall means 74 captivate the back wiring screw 64 against outward movement through the side opening 84. Inward axially directed movement of the back wiring screw 64 is of course prevented by the terminal plate 62 and the back wiring screw 64 is thus captivated against unitary movement along its axis. In view of the captivation of the nut 76, twisting of the back wiring screw 64 thus results only in advancement or withdrawal of the nut 76 relative to the terminal plate 62 depending on the direction of twist. Wire insertion openings through the rear side of the receptacle 10 provide for "back wiring" in the sense that wires inserted through the openings 90 are clamped against the terminal plate 62 by the nut 76 when the screw 64 is tightened.

Figure 2:
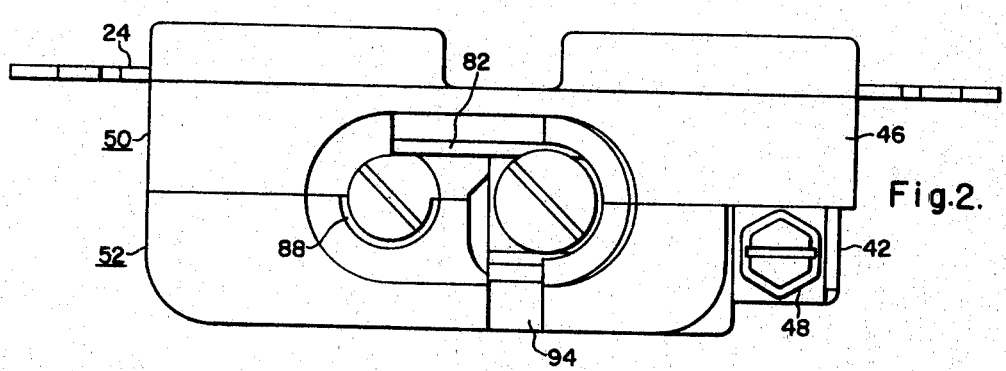
FIG. 2 is a side view of the grounding receptacle shown in FIG. 1.

In the case of the side wiring screw 60 the threaded shank 66 thereof is threadedly engaged with the terminal plate 58 and the screw 60 is free to be twisted outwardly of the associated wiring device side through the opening 86 to a point where conically staked shank end portion 92 prevents further withdrawal of the side wiring screw 60. "Side wiring" is then accomplished by looping a wire beneath the head of the screw 60 with an incoming portion (not shown) of the wire extending along channel 94 (FIG. 2) which extends from the rear side of the grounding receptacle 10 into communication with the side wiring screw opening 86. The side wiring screw 60 is then tightened after the wire looping step has been performed until the looped wire is clamped between the head of the side wiring screw 60 and the terminal plate 58.

Both "side" and "back" wiring are thus provided in the grounding receptacle 10 through respective operation of the screws 60 and 64. Both wiring methods are accomplished efficiently since the side wiring screw 60 is held against axial tipping movement by reason of its threaded engagement with the terminal plate 58 and further is limited in its outward movement from the terminal plate 58 only by the staked end portion 92. The back wiring screw 64 need not be held while inserting a wire through the openings 94 since the head of the screw 64 is captivated to prevent axially directed movement of the screw 64. Further, the housing 12 is cooperatively organized with the terminal and contact means 54 and the wiring screws 60 and 64 so as to contribute to the overall wiring efficiency. Thus, adjacent openings 84 and 86 provide for access to the screws 64 and 60, with the back wiring screws 64 captivated in the opening 84 and side wiring screws 60 being free to move outwardly through the opening 86 for wire looping thereabout.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A wiring device comprising an insulative housing within which there are disposed at least one contact and terminal means including a fixed terminal plate portion, a back wiring screw and a side wiring screw disposed in spaced relation on said contact and terminal means such that respective shanks thereof extend through respective terminal plate portions of said contact and terminal means, said screws further exposed to the exterior through respective access openings in one side of said housing, means for captivating said back wiring screw against shank axial movement and for captivating a clamping nut engaged therewith against rotative movement within a housing back wiring pocket therefor, at least one opening in a rear side of said housing aligned with said back wiring pocket for wire insertion between said clamping nut and the associated terminal plate portion, and said side wiring screw having its shank threadedly engaged with the associated terminal plate portion and axially movable along a housing side wiring pocket, the housing side access opening associated with said side wiring screw structurally arranged to provide for outward movement of said side wiring screw to an extent limited only by a staked end portion of said side wiring screw shank.

2. A wiring device as set forth in claim 1, wherein said device is provided as a duplex receptacle and a pair of contact and terminal means are disposed therein, each of said contact and terminal means having a blade contact portion adjacent each of opposite ends thereof and having said terminal plate portions disposed intermediately of said contact portions.

(References on following page)

References Cited by the Examiner

UNITED STATES PATENTS

| | | | |
|---|---|---|---|
| 1,026,653 | 5/1912 | Brunt | 339—32 |
| 1,365,152 | 1/1921 | Burton | 339—33 |
| 2,262,712 | 11/1941 | Shenton | 339—164 |
| 2,317,382 | 4/1943 | Hubbell | 339—164 X |
| 2,686,297 | 8/1954 | Hutt | 339—164 X |
| 2,780,790 | 2/1957 | Hubbell | 339—164 |
| 2,991,443 | 7/1961 | Hubbell et al. | 339—164 |
| 3,032,736 | 5/1962 | Howells | 339—14 |
| 3,036,285 | 5/1962 | Smith | 339—14 |
| 3,066,204 | 11/1962 | Mobarry | 339—32 X |
| 3,118,714 | 1/1964 | Ludwig | 339—14 |

FOREIGN PATENTS 465,719　6/1950　Canada.

EDWARD C. ALLEN, *Primary Examiner.*

J. D. SEERS, ALFRED S. TRASK, *Examiners.*